(12) United States Patent
Sato et al.

(10) Patent No.: US 6,224,439 B1
(45) Date of Patent: May 1, 2001

(54) FUEL FILTER FOR ENGINE

(75) Inventors: Takayuki Sato; Hitoshi Motose, both of Shizuoka (JP)

(73) Assignee: Sanshin Kogyo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/338,370

(22) Filed: Jun. 23, 1999

(30) Foreign Application Priority Data

Jul. 8, 1998 (JP) .................................................. 10-192583

(51) Int. Cl.[7] .................................................. B63H 21/10
(52) U.S. Cl. .............................................................. 440/88
(58) Field of Search ............................ 440/1, 2, 88, 900; 210/85, 86, 94, 313, 311, 799

(56) References Cited

U.S. PATENT DOCUMENTS

| 5,036,822 | 8/1991 | Kojima . |
| 5,879,543 | * 3/1999 | Amini ..................................... 210/86 |
| 5,916,442 | * 6/1999 | Goodrich .............................. 210/311 |
| 5,993,675 | * 11/1999 | Hagerthy ............................... 210/799 |

* cited by examiner

Primary Examiner—Stephen Avila
(74) Attorney, Agent, or Firm—Knobbe, Martens, Olson & Bear, LLP (57) ABSTRACT

A fuel filter for an internal combustion engine suitable for detecting water accumulated therein. The fuel filter has a holder that is mounted on the engine and holds a filter body. A vessel is detachably affixed to the holder. There is a space between the end of the filter body and the bottom of the vessel. An inlet and outlet are provided for inducing fuel into and discharging it from the vessel. The inlet and outlet are connected relative to each other through the filter body for admitting flow of the fuel. In one feature of this invention, a water detection mechanism is placed under the filter body in the vessel. In another feature of this invention, the vessel is made of a transparent material. In a further feature, the holder is mounted on the engine via a damping member.

18 Claims, 6 Drawing Sheets

FUEL FILTER FOR ENGINE

BACKGROUND OF THE INVENTION

1. Field of the Invention

This invention relates to a fuel filter for an engine and more particularly to a fuel filter for separating water from fuel contained therein and is most suitable to a marine engine.

2. Description of Related Art

At the present time, a large number of engines are used for marine application such as an outboard motor and a stem drive system. A fuel supply system is provided for supplying fuel to the engine. For example, a fuel tank is a first component of the fuel supply system for an engine of an outboard motor and it is located generally in a watercraft with which the outboard motor is associated. The other components of the fuel supply system, except a manually operable fuel pump, are placed on the engine that is accommodated in the outboard motor.

In the meantime, the fuel supply components for marine engines are situated under relatively rigorous conditions. Particularly, circumambient water can break into them unless any protection is given. The components on the engine are well protected against the water by a top cowling member and a bottom cowling member both surrounding the engine. However, the fuel tank is likely to be laid on a deck without any protection against the water invasion. Accordingly, water may intrude into the fuel supply system from the fuel tank. The water mingled with the fuel may not only exert undesirable influence to engine operation but also jeopardize engine life.

In order to prevent water from entering the engine (more specifically, its combustion chamber), the fuel supply system generally has a fuel filter therein to separate water from fuel in addition to removing foreign substances. Most of the fuel filters employ a vessel into which fuel containing water is induced. Water has the specific gravity greater than that of the fuel if it is gasoline or kerosene. Because of the differences in the respective specific gravity of the two liquids, the water is separated from the fuel and accumulates under the fuel layer, i.e., at the bottom of the vessel.

For example, an engine operating on a four stroke principle is one of such engines. Because lubricant is not mixed with the fuel in this four stroke engine, much less water may not be present in the fuel.

A direct cylinder injected engine is another one of such engines. This engine has a fuel injector for directly spraying fuel into a combustion chamber. The sprayed fuel is mixed with air charge induced through an air induction device into the combustion chamber for combustion. The air fuel ratio must be strictly controlled for good emissions in this engine. If, however, water is mingled to the fuel, the air fuel ratio will be apparently changed. Thus, the direct cylinder injected engine is not compatible with water mingled with fuel.

In the meantime, marine engines, particularly an outboard motor, easily generate much vibration. One of the reasons is that the outboard motor is arranged to be detachable from a hull of a watercraft and hence it cannot be very strictly fixed thereto. Due to the much vibration, conventionally, water in fuel is likely to be mixed up with the fuel and both of the water and the fuel are hardly separated from each other during the engine is running.

It is, therefore, a principal object of this invention is to provide a fuel filter that is rarely influenced by vibration in separation of water from fuel.

Also, an operator of an outboard motor must check regularly if water accumulates in the fuel filter. However, this check usually compels the operator to take an unnatural position because the operator should approach the fuel filter from the watercraft.

It is, therefore, another object to provide a fuel filter whereby accumulated water therein can be checked easily.

It is an idea to provide a water detection mechanism in a fuel filter and also a warning system at an appropriate location to indicate the water accumulation to the operator of the engine so that the operator may throw the accumulated water away as well as deposited foreign substances at proper timings. However, as described above, there is much vibration in the engine. Thus, the water detection mechanism must be arranged to work accurately even under the circumstances.

It is, therefore, a further object to provide a fuel filter wherein a water level is accurately sensed with a water detection mechanism even there is vibration in the engine.

Also, room or a space for the fuel filter is generally small in the engine if it is for an outboard motor. Because, as described above, cowling members are provided around it. Accordingly, the fuel filter should be formed as small as possible even a water detection mechanism is contained therein.

It is, therefore, a firther object to provide a compact fuel filter that can still contain a water detection mechanism.

SUMMARY OF THE INVENTION

This invention is adapted to be embodied in a fuel filter for an internal combustion engine.

In accordance with a first aspect of this invention, the fuel filter has a holder adapted to be mounted on the engine. A filter body is held by the holder. The filter body has an end portion. A vessel is detachably affixed to the holder for containing the filter body. The vessel has a bottom portion spaced from the end portion of the filter body. An inlet is provided for inducing fuel into the vessel. An outlet is provided for discharging the fuel from the vessel. The inlet and the outlet are connected relative to each other through the filter body for admitting flow of the fuel.

In accordance with a second aspect of this invention, the fuel filter has a holder adapted to be mounted on the engine. A filter body is held by the holder. The filter body has an end portion. A vessel is detachably affixed to the holder for containing the filter body. The vessel is made of a transparent material. An inlet is provided for inducing fuel into the vessel. An outlet is provided for discharging the fuel from the vessel. The inlet and the outlet areconnected relative to each other through the filter body for admitting flow of the fuel.

In accordance with a third aspect of this invention, the fuel filter has a holder adapted to be mounted on the engine via a damping member. A filter body is held by the holder. The filter body has an end portion. A vessel is detachably affixed to the holder for containing the filter body. An inlet is provided for inducing fuel into the vessel. An outlet is provided for discharging the fuel from the vessel. The inlet and the outlet are connected relative to each other through the filter body for admitting flow of the fuel.

In accordance with a fourth aspect of this invention, a water accumulation warning system is embodied for a fuel filter of an internal combustion engine. The fuel filter includes a filter body, a vessel for containing the filter body, an inlet for inducing fuel into the vessel, and an outlet for discharging the fuel from the vessel. The inlet and the outlet are connected relative to each other through the filter body for admitting flow of the fuel. The water accumulation warning system includes a water detection mechanism for detecting accumulation of water in the vessel to output a detection signal. The water accumulation warning system further includes a warning mechanism for warning accumulation of water in the vessel based upon the detection signal.

BRIEF DESCRIPTION OF THE DRAWINGS

These and other features of this invention will now be described with reference to the drawings of preferred embodiments which are intended to illustrate and not to limit the invention.

DETAILED DESCRIPTION OF THE PREFERRED EMBODIMENTS OF THE INVENTION

The general overall environment in which the invention is practiced and certain details of the engines will be described primarily by reference to FIG. 1 and additionally to FIGS. 2 and 3.

Figure 1:
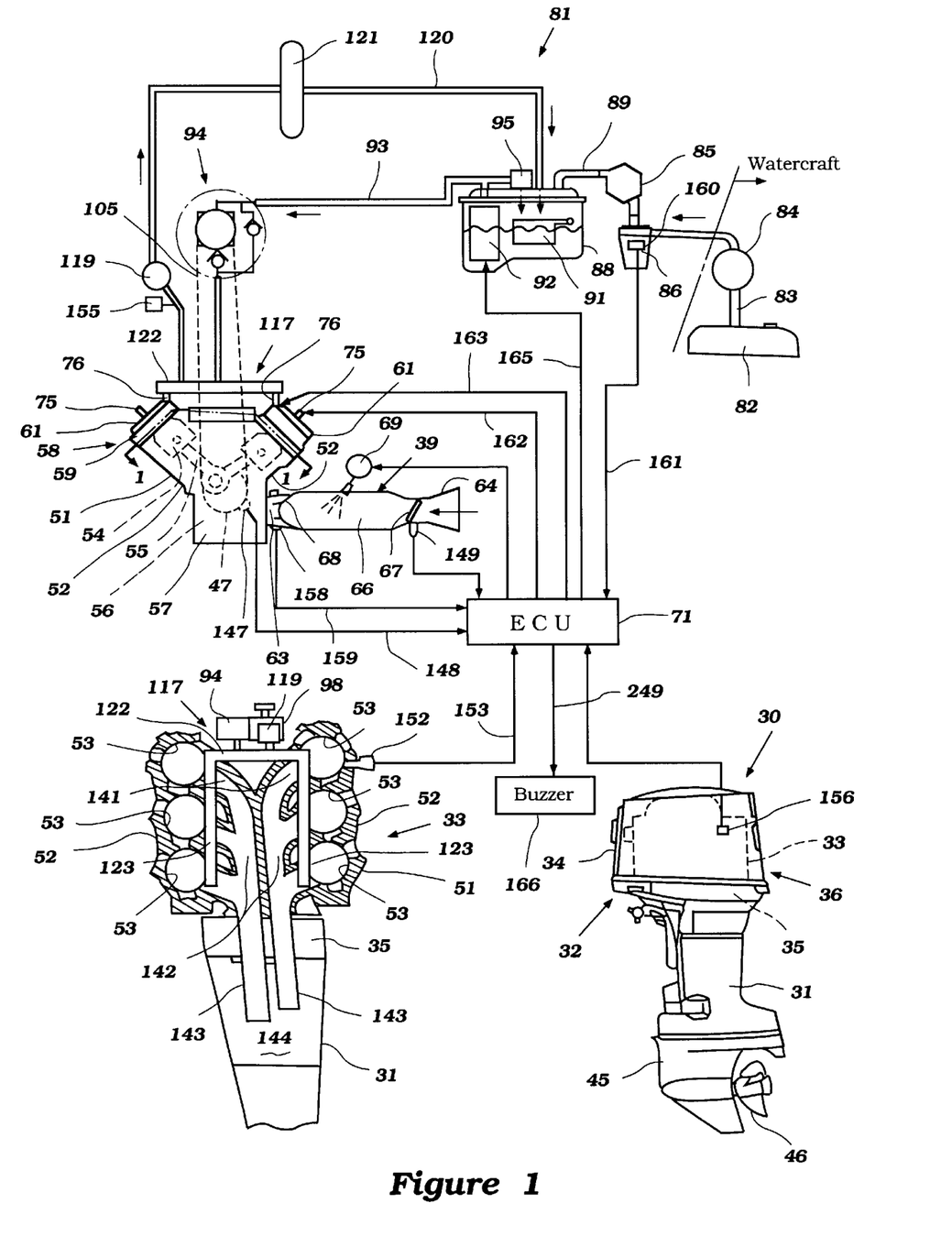
FIG. 1 is a multi-part view showing: in the lower right-hand portion, an outboard motor embodying the inventions; in the upper view, a partially schematic view of the engine of the outboard motor with its induction and fuel injection system shown in part schematically; in the lower left-hand portion, a rear elevational view of the outboard motor with portions removed and other portions broken away and shown in section along the line 1—1 in the upper view so as to more clearly show the construction of the engine; and fuel injection system shown in part schematically. An ECU (Electric Control Unit) for the motor links the three views together.

In the lower-right hand view of the FIG. 1, an outboard motor constructed and operated in accordance with an embodiment of the invention is depicted in side elevational view and is identified generally by the reference numeral 30.

The entire outboard motor 30 is not depicted in that the swivel bracket and clamping bracket that are associated with the driveshaft housing, indicated generally by the reference numeral 31, are not illustrated. This is because these components are well known in the art and the specific method by which the outboard motor 30 is mounted to the transom of an associated watercraft is not necessary to permit those skilled in the art to understand or practice the invention.

The outboard motor 30 includes a power head, indicated generally by the reference numeral 32, that is positioned above the driveshaft housing 31 and which includes a powering internal combustion engine, indicated generally by the reference numeral 33. This engine 33 is shown in more detail in the remaining two view of this figure and will be described shortly by reference thereto.

The power head 32 is completed by a protective cowling which includes a top cowling member 34. This top cowling member 34 is detachably connected to an exhaust guide 35 which has a lower tray portion or bottom cowling member 36 of the protective cowling 32 encircling an upper portion of the driveshaft housing 31. The top cowling member 34 and the bottom cowling member 36 are mated with each other to completely accommodate the engine 33 therein. The mating line or face of the top cowling 34 and the bottom cowling 36 is indicated with the reference numeral 37 in FIG. 3. The top cowling member 34 has a pair of air compartments (not shown) opening rearwardly so that air is introduced inside of the top cowling member 34 and then goes to an air induction system 39 (see the upper view).

Positioned beneath the driveshaft housing 31 is a lower unit 45 in which a propeller 46, which forms the propulsion device for the associated watercraft, is journaled.

As is typical with outboard motor practice, the engine 33 is supported in the power head 32 so that its crankshaft 47 (see the upper view) rotates about a vertically extending axis. This is done so as to facilitate the connection of the crankshaft 47 to a driveshaft (not shown) which depends into the driveshaft housing 31 and which drives the propeller 46 through a conventional forward, neutral, reverse transmission contained in the lower unit 45.

The details of the construction of the outboard motor and the components which are not illustrated may by considered to be conventional or of any type known to those wishing to utilize the invention disclosed herein. Those skilled in the art can readily refer to any known constructions with which to practice the invention.

Referring now in detail to the construction of the engine 33 still by primary reference to FIG. 1, in the illustrated embodiment, the engine 33 is of the V6 type and operates on a two stroke, crankcase compression principle.

Although the engine 33 will be described as operating on a two stroke principle, it will also be apparent to those skilled in the art that a fuel filter described below can be employed in conjunction with four stroke engines. In fact, it also can be employed with rotary type engines.

The engine 33 is comprised of a cylinder block 51 that is formed with a pair of cylinder banks 52. Each of these cylinder banks 52 is formed with three vertically spaced, horizontally extending cylinder bores 53. Pistons 54 reciprocate in these cylinder bores 53. The pistons 54 are, in turn, connected to the upper or small ends of connecting rods 55. The big ends of these connecting rods are journaled on the throws of the crankshaft 47 in a manner that is well known in the art.

The crankshaft 47 is journaled in a suitable manner for rotation within a crankcase chamber 56 that is formed in part by a crankcase member 57 that is affixed to the cylinder block 51 in a suitable manner. As is typical with two stroke engines, the crankshaft 47 and crankcase chamber 56 are formed with seals so that each section of the crankcase that is associated with one of the cylinder bores 53 will be sealed from the others. This type of construction is well known in the art.

A cylinder head assembly, indicated generally by the reference numeral 58, is affixed to the end of the cylinder banks 52 that are spaced from the crankcase chamber 56. These cylinder head assemblies 58 are comprised of a main cylinder head member 59 that defines a plurality of recesses (not shown) in its lower face. Each of these recesses corporate with the respective cylinder bore 53 and the head of the piston 54 to define the combustion chambers of the engine. This is also well known in the art. A cylinder head cover member 61 completes the cylinder head assembly 58. The cylinder head members 59 and 61 are affixed to each other and to the respective cylinder banks 52 in a suitable known manner.

The aforenoted air induction system 39 is provided for delivering an air charge to the sections of the crankcase chamber 56 associated with each of the cylinder bores 53. This communication is via an intake port 63 formed in the crankcase member 57 and registering with each such crankcase chamber section.

The induction system 39 includes an air silencing and inlet device, shown schematically in this figure and indicated by the reference numeral 64. The actual construction of this air charge device appears in FIGS. 2 and 3. In actual physical location, this device 64 is contained within the top cowling member 34 at the forward end thereof and has a rearwardly facing air inlet opening 65 through which air is introduced.

The air inlet device 64 supplies the induced air to a plurality of throttle bodies 66, each of which has a throttle valve 67 provided therein. These throttle valves 67 are supported on throttle valve shafts (not shown). These throttle valve shafts are linked to each other for simultaneous opening and closing of the throttle valves 67 in a manner that is well known in this art.

As is also typical in two stroke engine practice, the intake ports 63 have, provided in them, reed-type check valves 68. These check valves 68 permit the air to flow into the sections of the crankcase chamber 56 when the pistons 54 are moving upwardly in their respective cylinder bores. However, as the pistons 54 move downwardly, the charge will be compressed in the sections of the crankcase chamber 56. At that time, the reed type check valve 68 will close so as to permit the charge to be compressed. In addition, lubricant pumps 69 are provided for spraying lubricant into the throttle bodies 66 for engine lubrication under the control of an ECU (Electronic Control Unit) 71 that will be described more in detail later. Although it is not shown, some forms of direct lubrication may be also employed for delivering lubricant directly to certain components of the engine.

The charge which is compressed in the sections of the crankcase chamber 56 is then transferred to the combustion chambers as through a scavenging system (not shown) in a manner that is well known. A spark plug 75 is mounted in the cylinder head assembly 58 for each cylinder bore. The spark plug 75 is fired under the control of the ECU 71.

The spark plug 75 fire a fuel air charge that is formed by mixing fuel directly with the intake air via a fuel injector 76. The fuel injectors 76 are solenoid type and electrically operated also under the control of the ECU 71. The fuel injectors 76 are mounted directly in the cylinder head 59 in a specific location so as to provide optimum fuel vaporization under all running conditions.

Fuel is supplied to the fuel injectors 76 by a fuel supply system, indicated generally by the reference numeral 81 (see the upper and lower left hand views of FIG. 1). The fuel supply system 81 composes a main fuel supply tank 82 that is provided in the hull of the watercraft with which the outboard motor 30 is associated. This fuel supply tank 82 is usually exposed to external environment such as spray or splash of water. Accordingly the water is likely to enter the fuel tank 82 rather than a fuel tank for automobiles, although such a water intrusion is prevented as strictly as possible.

Fuel is drawn from this tank 82 through a conduit 83 by means of a first low pressure pump 84 placed in the hull of the watercraft and a plurality of second low pressure pumps 85 mounted on the engine 33. The first low pressure pump 84 is a manually operated pump and the second low pressure pumps 85 are diaphragm type pumps operated by variations in pressure in the sections of the crankcase chamber 56, and thus provide a relatively low pressure.

A quick disconnect coupling (not shown) is provided after the manually operated pump 84 in the conduit 83. A fuel filter 86 is positioned in the conduit 83 immediately after the disconnect coupling. Thus, the fuel filter 86 is a first member that is positioned on the engine 33 in the fuel supply system 81. In other words, the fuel filter 86 is located most upstream of the part that exists on the engine 33 in the fuel supply system 81. As seen in FIG. 3, the fuel filter 86 is so mounted on a side wall of the cylinder block 51 that its bottom is placed higher than the mating line 37 of the top cowling 34 with the bottom cowling 36. Because of this, the fuel filter 86 can be attached to or detached from the cylinder block 51 easily. After removing the top cowling 34, the operator of the outboard motor 30 accesses the spot without being hampered by the bottom cowling 36. The fuel filter 86 will be described more in detail with reference to FIG. 4 later.

Figure 3:
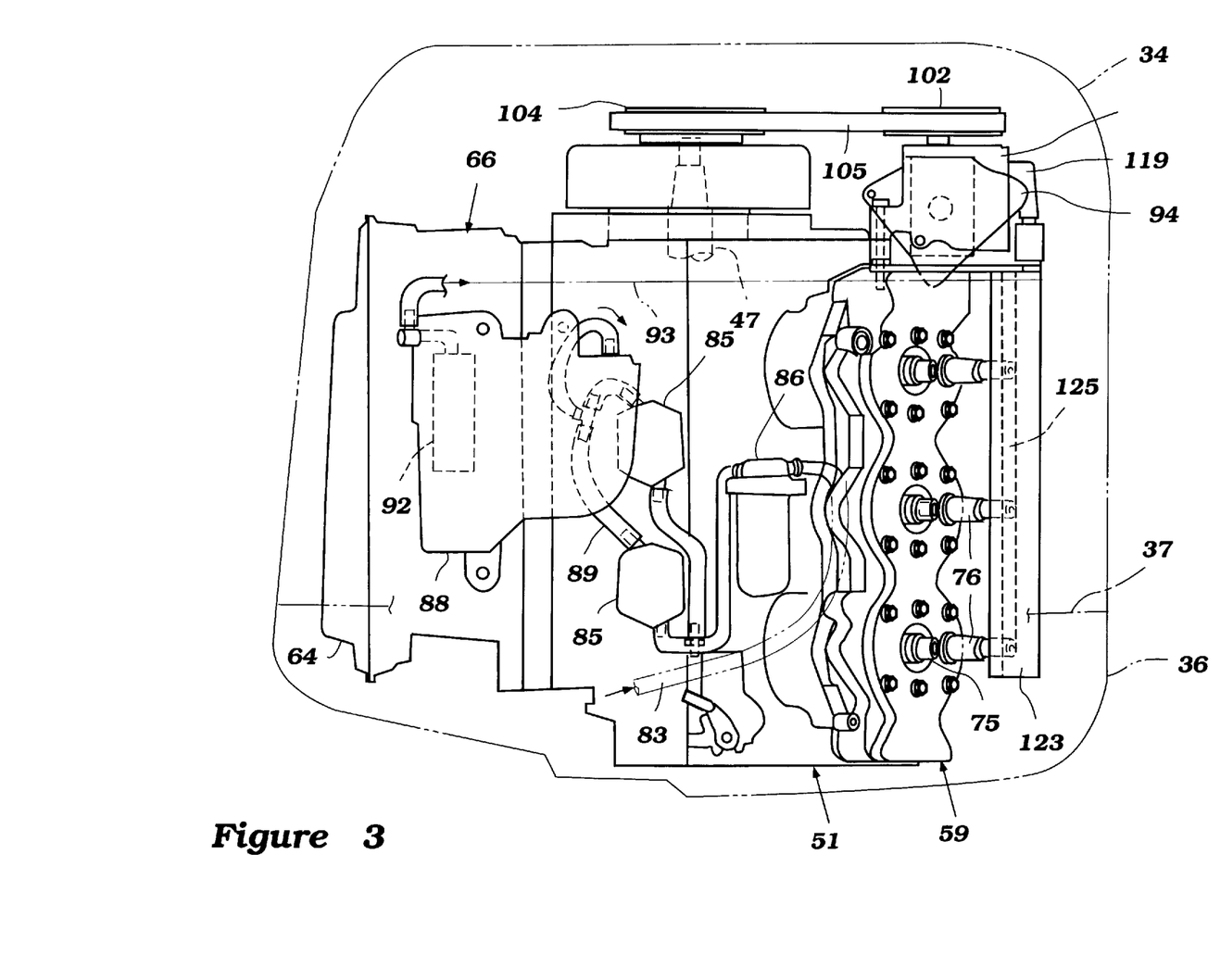
FIG. 3 is a side elevational view of the power head showing the engine in solid lines and the protective cowling in phantom, and is taken in the direction of the arrow 2 in FIG. 2.

From the low pressure pump 85, fuel is supplied to a vapor separator 88 which is mounted on the engine 33 or within the top cowling 34 as shown in FIG. 3. This fuel is supplied through a line 89. At the vapor separator 88 and the end of the line 89, there is provided a float valve (not shown) that is operated by a float 91 so as to maintain a uniform level of fuel in the vapor separator 88.

A high pressure electric fuel pump 92 is provided in the vapor separator 88 and pressurizes fuel that is delivered through a fuel supply line 93 to a high pressure pumping apparatus or high pressure fuel pump, indicated generally by the reference numeral 94. The electric fuel pump 92, which is driven by an electric motor, develops a pressure such as 3 to 10 kg/cm$^2$. A low pressure regulator 95 is positioned in the line 93 at the vapor separator 88 and limits the pressure that is delivered to the high pressure pumping apparatus by dumping the fuel back to the vapor separator 88.

The high pressure fuel pump 94 can develop a pressure of, for example, 50 to 100 kg/cm$^2$ or more. A pump drive unit 98 (the lower left hand view) is provided for driving the high pressure fuel pump 94.

Figure 2:
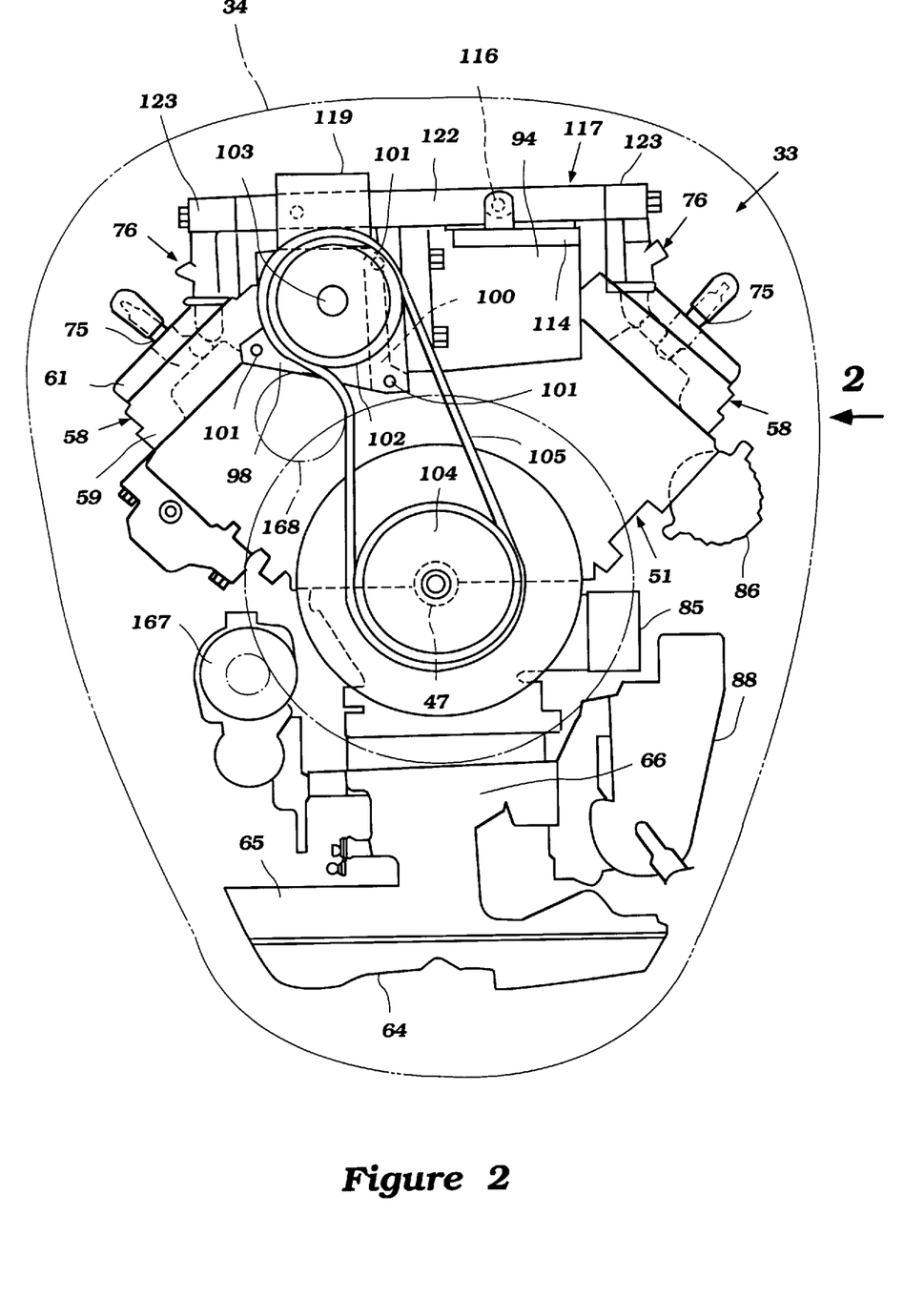
FIG. 2 is a top plan view of the power head showing the engine in solid lines and the protective cowling in phantom.

Referring to FIG. 2, the pump drive unit 98 is affixed to the cylinder body 51 and the cylinder head members 59 partly directly and partly via a stay 100 with bolts 101 so as to be overhanged between the two banks 52 of the V arrangement. A pulley 102 is affixed to a pump driveshaft 103 of the pump drive unit 98. The pulley 102 is driven from a driving pulley 104 affixed to the crankshaft 47 by means of a drive belt 105. The pump driveshaft 103 is provided with a cam disc (not shown) existing horizontally for pushing plungers (not shown) which are disposed on the high pressure fuel pump 94. Thus, the high pressure fuel pump 94 is activated as a pump when the pump drive unit 98 is driven by the crankshaft 47.

The high pressure fuel pump 94 is mounted on the pump drive unit 98. The high pressure fuel pump 94 has a unified fuel inlet and outlet module 114 which is mounted on a side wall of the high pressure fuel pump 94. This unified fuel inlet and outlet module 114 is omitted in FIG. 1. An outlet passage 116 is connected to a fuel supply conduit indicated generally by the reference numeral 117.

The pressure of the fuel supplied by the fuel pump 94 is regulated to be the fixed value by a high pressure regulator 119 which dumps fuel back to the vapor separator 88 through a pressure relief line 120 in which a fuel heat exchanger or cooler 121 is provided. It is important to keep the fuel under the constant pressure. Because the fuel amounts to be sprayed into the combustion chambers are determined by changes of duration of injection under the condition that the pressure for injection is always the same. The pressure regulator 119 is also mounted on the pump drive unit 98.

Fuel is supplied from the high pressure fuel pump 94 to the fuel supply conduit. The fuel supply conduit 117 is comprised of a main fuel manifold 122 extending horizontally and a pair of fuel rails 123 extending vertically and connected with the main manifold 122. The fuel supply conduit 117 is affixed to the cylinder block 51 and the cylinder heads 59 in a suitable manner. The main fuel manifold 122 and the fuel rails have hollows that form fuel passages 125 (see FIG. 3). The fuel injectors 76 are affixed between the fuel rails 123 and the cylinder head members 59. Nozzles (not shown) of the fuel injectors 76 are exposed to the respective combustion chambers. The main fuel manifold 122 delivers fuel to the fuel rails 123 and the fuel rails 123, in turn, delivers the fuel to the fuel injectors 76. Thus, the fuel is finally supplied to the fuel injectors 76.

Returning back to FIG. 1, after the fuel charge has been formed in the combustion chambers by the injection of fuel from the fuel injectors 76, the charge is fired by firing the spark plugs 75. The injection timing and duration, as well as the control for the timing of firing of the spark plugs 75, are controlled by the ECU 71.

Once the charge burns and expands, the pistons 54 will be driven downwardly in the cylinder bores until the pistons 54 reach the lowermost position. At this time, an exhaust port (not shown) will be uncovered so as to open the communication with an exhaust passage 141 (see the lower left-hand view) formed in the cylinder block 51. The exhaust gases flow through the exhaust passages 141 to manifold collector sections 142 of respective exhaust manifolds that are formed within the cylinder block 51. These exhaust manifold collector sections 142 communicate with exhaust passages formed in an exhaust guide plate 35 on which the engine 33 is mounted.

A pair of exhaust pipes 143 depends from the exhaust guide plate 35 and extend the exhaust passages 141 into an expansion chamber 144 formed in the driveshaft housing 31. From this expansion chamber 144, the exhaust gases are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

A feedback control system, indicated generally by the reference numeral 146 is provided for realizing a control strategy along which the beginning and duration of fuel injection from the injector 76 and timing of firing of the spark plug 75 are controlled.

The feedback control system 146 comprises the ECU 71 as a control device and a number of sensors which sense either engine rnning conditions, ambient conditions or conditions of the outboard motor 30 that will effect engine performance. Certain of the sensors are shown schematically in FIG. 1 and will be described by reference to that figure.

There is provided, associated with the crankshaft 47, a crankshaft angle position sensor 147 which, when measuring crankshaft angle versus time, outputs a crankshaft rotational speed signal or engine speed signal indicated schematically at 148 to the ECU 71.

Operator demand or engine load, as determined by throttle angle of the throttle valve 67, is sensed by a throttle position sensor 149 which outputs a throttle position or load signal 151 to the ECU 71. When the operator desires to gather speed, i.e., accelerate the engine speed, a throttle on a steering handle (not shown) is operated by the operator. The throttle valve 67 is, then, going to open toward the certain open position that corresponds to the desired speed at which air charge is induced, the amount of which is greater than before, into the crankcase chamber 56 through the throttle bodies 66. Also, the engine load increases, for example, when the associated watercraft advances against wind. In this situation, the operator also operates the throttle so as to recover the speed that is lost.

A combustion condition or oxygen sensor 152 is provided that senses the in cylinder combustion conditions by sensing the residual amount of oxygen in the combustion products at a time near the time when the exhaust port is opened. This output and air fuel ratio signal are indicated schematically at 153 to the ECU 71.

There is also provided a pressure sensor 155 in line connected to the pressure regulator 119. This pressure sensor 155 outputs the high pressure fuel signal to the ECU 71 (its signal line is omitted in FIG. 1).

There also may be provided a water temperature sensor 156 (see the lower right-hand view) which outputs a cooling water temperature signal 157 to the ECU 71.

Further, an intake air temperature sensor 158 (see the upper view) is provided and this sensor 158 outputs an intake air temperature signal 159 to the ECU 71.

Still further, a water sensor or a proximity switch 160 is provided in the fuel filter 86 which outputs a water detection signal 161 to the ECU 71. The proximity switch 160 will be described more in detail with reference to FIG. 4 later.

Although these are all sensors shown in FIG. 1, it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 71, as has been noted, outputs signals to the fuel injectors 76, spark plugs 75, the lubrication pumps 69 and the high pressure electric fuel pump 92 for their respective control. These control signals are indicated schematically in FIG. 1 at 162, 163, 164 and 165, respectively.

The ECU 71 also provides a signal to sound a buzzer 166 in accordance with a control routine that will be described with reference to FIG. 5 later. The buzzer 166 is placed on the outboard motor 30 at an appropriate location or at a control panel of the associated watercraft.

In addition, a starter motor 167 for starting the engine 33 and a tensioner 168 for giving tension to the belt 105 are provided (see FIG. 2).

Figure 4:
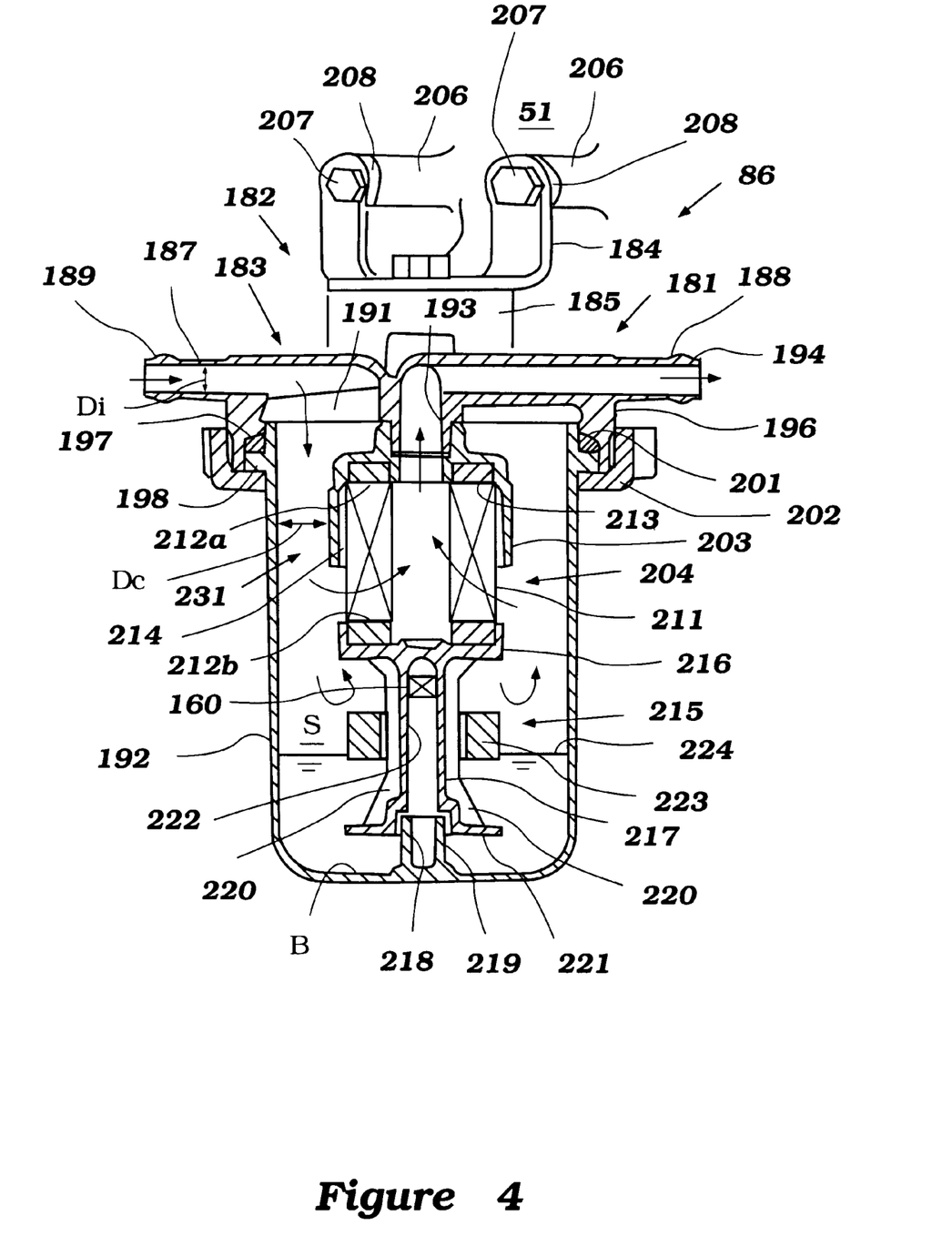
FIG. 4 is a cross-sectional view showing a fuel filter embodying features of this invention.

FIG. 4 illustrates a cross sectional view showing a fuel filter embodying features of this invention.

The fuel filter 86 includes a holder indicated generally by the reference numeral 181. The holder 181 has a mounting member 182 that is formed with a mounting body 183 and a forked member 184 affixed to a stay portion 185 of the mounting body 183 with a bolt 186.

The mounting body 183 is generally shaped, except the stay portion 185, as a reversed saucer and an inlet passage 187 and an outlet passage 188 are integrally formed therein. The inlet passage 187 has a connecting portion 189 which is connected to the conduit 83 (see the upper view of FIG. 1) and an opening portion 191 from which fuel is relieved into a vessel 192. Meanwhile the outlet passage 187 has a suction portion 193 which opens to the vessel 192 and a connecting portion 194 which is connected to the conduit 89 (see FIG. 1).

The mounting body 183 has also a circular engaging portion 196 extending downwardly at its bottom. The outer surface of the engaging portion 196 is threaded, while the inner surface of the engaging portion 196 has a step 197 formed circularly.

The vessel 192 has a circular flange 198 extending outwardly at almost the top thereof. The circular step 197 of the mounting body 183 and the circular flange 198 of the vessel 192 are mated with each other via a seal member 201. Then, a circular fixing member or a coupler 202, which is threaded at its inner surface, is tightened with the threaded engaging portion 196 so that the vessel 192 is fixed to the mounting body 183.

Other fixing measures are of course practicable to fix the vessel 192 to the mounting body 183 inasmuch as the vessel 192 is detachable. For example, the vessel 192 may be fitted onto the mounting body 183 by making at least an engaging part using a flexible material such as a synthetic resin. However, the screw connection described above seems to be the most suitable manner because the outboard motor 30 is likely to have much vibration.

The mounting body 183 is completed with an upside-down tray or a holding part 203, which is connected to the suction portion 193 of the outlet passage 188 by caulking or welding, to hold a filter body 204. In variation, the upside-down tray 203 may be screwed to the suction portion 193.

Thus, the holder 181 comprises the mounting member 182 that is formed with the forked member 184 and the mounting body 183. Then, the mounting body 183 includes the stay portion 185, the inlet passage 187, outlet passage 188, engaging portion 196 and the upside-down tray 203. Although the holder 181 is made of a metal in this embodiment, synthetic resin can be used as a material therefor.

The forked member 184 of the holder 181 is mounted on a pair of bosses 206, which protrude at a side wall of the cylinder block 51, with bolts 207. A pair of elastic members 208 are inserted between the forked member 184 and the bosses 206 so that vibration in the engine 33 is precluded from being transmitted to the fuel filter 86. The elastic members 208 are made of a damping material such as a rubber.

Because of the insertion of the elastic members 208, vibration in the fuel filter 86 reduces. Thus, accurate detection of a water level, which will be described later, will be ensured.

The filter body 204 is formed with a cylindrical, hollowness filter member 211 and a pair of attachment members 212a, 212b that are attached to both ends of the filter member 211. The filter member 211 is made of a material that can allow fuel to go through it but prevent foreign substances from passing through it. Specifically, the fuel is gasoline in this embodiment. However, kerosene is of course applicable in some other engines. The upper attachment 211a is held in a recess 213 of the upside-down tray 203. There is a gap 214 between the upside-down tray 203 and the filter member 211 so that the whole outside surface of the filter member 211 is allowed to be opened for fuel.

As seen in FIG. 4, a space S is formed under the filter body 204 in the vessel 192. That is, the bottom portion B of the vessel 192 is spaced from the filter body 204 at least longer than the length of the filter body 204, more specifically, its length along the longitudinal axis (the same as an axis 253 shown in FIG. 6 and will be described later). Also, the volume of this space S is larger than the volume of the filter body 204. In this embodiment, this space S is used for accommodating a water detection mechanism 215 as described hereunder shortly.

The lower attachment member 212b of the filter body 204 is supported by a tray portion 216 of a stem 217 which is made of synthetic resin. The stem 217 has a recess 218 at its bottom end and the recess 218 is relatively loosely put on a post 219 that stands upwardly from the bottom portion B of the vessel 192 at its center position. The stem 217, accordingly, extends upwardly along the center axis of the vessel 192. When the lower attachment member 212b is supported by the stem 217, the tray portion 216 of the stem 217 covers the lower opening of the filter member 211. Accordingly, the inner passage 187 and the outer passage 188 are connected to each other only through the filter member 211. Also, the stem 217 has four ribs 220 extending radially around its body. The ribs 220 reinforce the stem 217 per se and the tray portion 216. A flange 221 is also formed at the bottom end of the stem 217.

The stem 217 further has a hollow 222 therein that continuously exists from the recess 218. The aforenoted proximity switch 160 is provided at a relatively upper portion in the hollow 222. The portion corresponds to the level of water that should be warned to the operator of the outboard motor 30. That is, if the water would accumulate to this level, it could flow out to the conduit 89 through the outlet passage 188 with the fuel and finally be sprayed to the combustion chambers: Accordingly, a warning to the operator is necessary when the water accumulates to this level.

Although almost all kinds of known proximity switches are applicable, this proximity switch 160 is a reed switch that is turned on by sensing magnetic force. To activate the proximity switch 160, a float 223 containing at least one magnet (not shown) is provided on the stem 217. The float 223 is generally configured as a circular shape and its inner wall is shaped along the outer shape of the stem 217 including the ribs 220. However, of course the float 223 may have any other shapes. The float 223 is arranged to be movable on the stem 217 upwardly and downwardly along the axis of the stem 217 with changes of the level 224 of the water that accumulates in the vessel 192. The specific gravity of the material for the float 223 is so selected that the float 223 is allowed to float on water and submerge to the bottom of the fuel, i.e., gasoline, that has the specific gravity smaller than that of water. A synthetic resin or some kind of metals are practicable.

A delay circuit (not shown) for dampening the on or off action of the proximity switch 160 is provided in this embodiment. Because a water level 224 can fluctuate by vibration or some other reasons and this causes often on and off actions of the proximity switch 160 when the float 223 is close to the switch 160. The ECU 71 may have a program instead of the delay circuit.

Thus, when the float 223 approaches to the proximity switch 160 with an ascent of the water level 224, the proximity switch 160 is turned on and senses that water accumulates to the warning level. Then, a detection signal of the water level is provided to the ECU 71 without fluctuating.

The stem 217, the post 219, the proximity switch 160, the float 223 and the delay circuit may form the aforenoted water detection mechanism 215 in the broad sense of the term. However, in the narrow sense and particularly in this embodiment, the proximity switch 160 and the float 223 form it.

As described above, the stem 217 and the post 219 are used not only for supporting the filter body 204 but also for holding the proximity switch 160 and the float 223. That is, the space S which is under the filter body 204 in the vessel 192 is effectively utilized. Accordingly, the fuel filter 86 can be as small as possible.

When the vessel 192 is fitted to the mounting body 183 of the holder 181, a crevice 231 is formed between primarily the filter body 204 and the inner wall of the vessel 192. That is, the filter body 204 is spaced from the inner wall of the vessel 192. In this embodiment, however, since the upside-down tray 203 covers relatively deeply the filter body 204, the crevice 231 is narrower between the upside-down tray 203 and the vessel 192 than between the filter body 204 and the vessel 192. The width or space Dc of the crevice 231 between the upside-down tray 203 and the vessel 192 at least in the proximity to the inlet passage 189 is arranged to be greater than the diameter Di of the inlet passage 187.

Because of this arrangement, smooth inflow of the fuel into the vessel 192 is ensured even if there is vibration in the fuel filter 86. Also, the fuel already contained in the vessel 192 is scarcely churned by upward and downward movement of the vessel 192 when the watercraft is running in a relatively high speed and/or on rough water. This is quite effective because water in the fuel is rapidly separated and falls down to the bottom of the vessel 192 without delay to stay there. Accordingly, the fuel passing through the filter body 204 will rarely contain water therein.

The vessel 192 is preferably made of a transparent synthetic resin so that the water level 224 is visible. If the vessel 192 is made of such a material, the water detection mechanism 215 can be removed. The operator just checks if water accumulates to the warning level that is predetermined with the naked eye at a proper timing. For this purpose, preferably a mark such as a red line is put on the vessel 192 at the warning level.

Fuel is supplied to the vessel 192 through the inlet passage 187 from the conduit 83. The flow of the fuel is indicated by arrows in FIG. 4. Since the width Dc of the crevice 231 is formed larger than the diameter Di of the inlet passage 187 as described above, the fuel may enter into the vessel 192 quite smoothly.

The supplied fuel is then pass through the filter member 211 and goes up to the outer passage 188 through the suction portion 193 by suction force generated in the second low pressure pump 85. As noted above, the whole outer surface of the filter member 211 is not covered by the upside-down tray 203. The fuel is, thus, admitted into the filter member 211 at the maximum surface area. Because of this, the fuel goes rapidly to the outlet passage 188 without being congested. When passing through the filter member 211, foreign substances are removed and deposited at the bottom of the vessel 192. The filtered fuel then goes to the conduit 89 after passing through the outlet passage 194.

As described above, water can be contained in the fuel. The water accumulates at the bottom of the vessel 192 because the specific gravity of water is larger than that of the fuel, i.e., gasoline. When the water level 224 approaches to the proximity switch 160, the magnet as the activator of the proximity switch 160 contained in the float 223 turns the proximity switch 160 on so that a detection signal is provided to the ECU 71.

Figure 5:
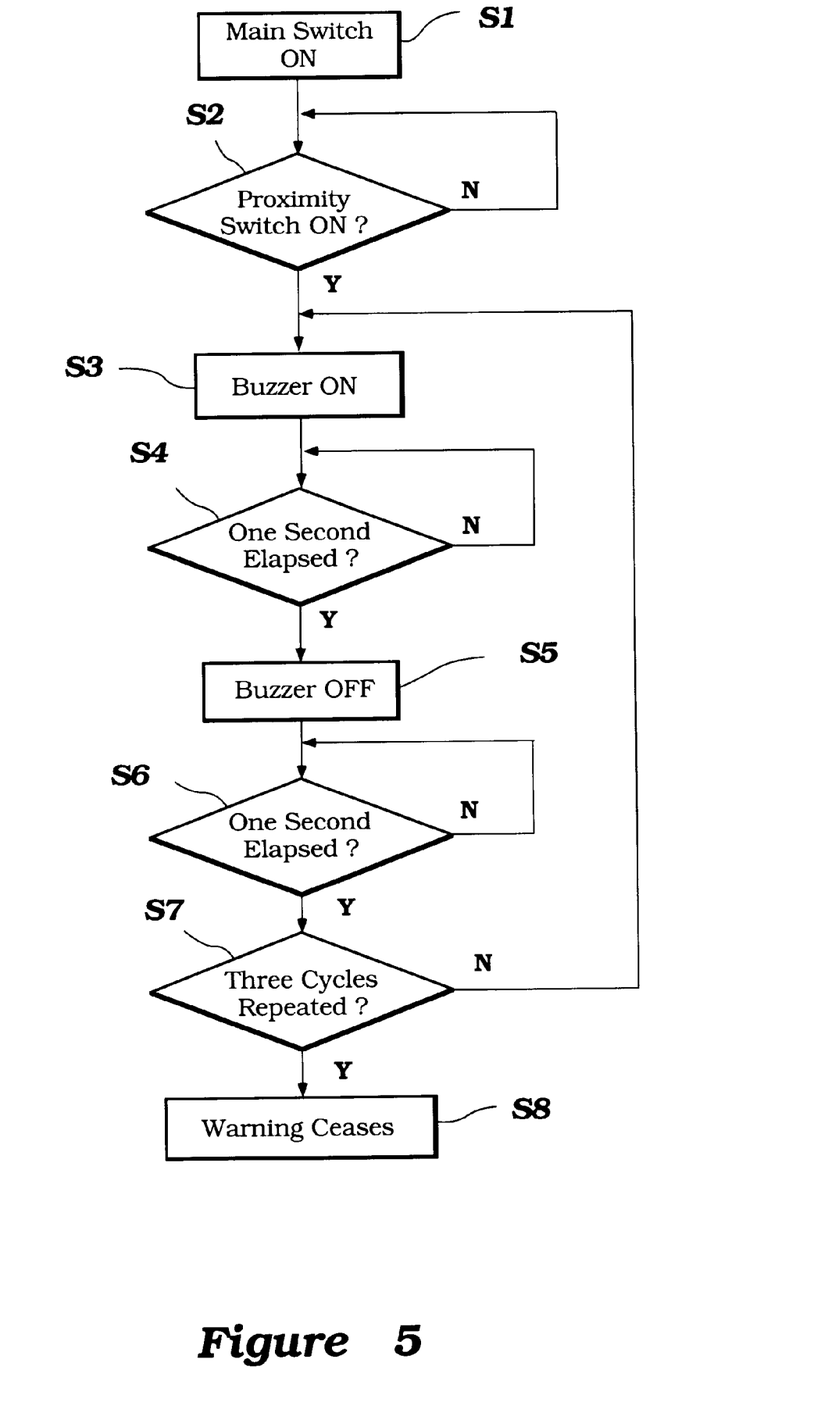
FIG. 5 is a flowchart showing a control routine associated with a water detection mechanism in the fuel filter and a warning operation controlled by the ECU 71.

FIG. 5 illustrates a flowchart showing a control routine associated with this water detection mechanism and a warning operation controlled by the ECU 71. The warning operation is done with a warning mechanism formed with the ECU 71 and the buzzer 166.

The program starts at a step S1 when a main switch (not shown) is turned on and goes to a step S2 to determine whether the proximity switch 160 is on or not. If it is negative, the program repeats this step S2. If it is positive, i.e., the proximity switch 160 is on, the buzzer 166 is activated with a signal 249 (FIG. 1) provided by the ECU 71 at a step S3.

Then, the program goes to a step S4 to determine whether the buzzer 166 continues to sound for one second. If not, the program repeats the step S4. If the buzzer 166 has sounded for one second, the program goes to a step S5 and stop the buzzer 166 sounding.

The program, next, goes to a step S6 to determine whether the buzzer 166 continues to stop sounding for one second. If not, the program repeats the step S6.

If the buzzer 166 has not sounded for one second, the program goes to a step S7 and checks whether the cycle in which the buzzer 166 sounds for one second and then stop sounding for one second is executed three times. If not, the program repeats the step S7 until the three cycles are completed. If it is positive and hence when the three cycles are completed, the program goes to a step S8 and ceases this warning routine.

When hearing the sound of the buzzer 166, the operator detaches the vessel 192 from the mounting body 183 of the mounting member 182 by removing the coupler 202 and then discharges the accumulated water as well as the deposited foreign substances in the vessel 192. After that, the vessel 192 is again attached to the mounting body 183 with the coupler 202.

As described above, the buzzer 166 intermittently sounds three times, each for one second, and then stops sounding. That is, this warning operation is relatively mild in comparison with a continuous or uninterrupted warning. A reason for this is that the mingled water does not cause very serious damage to the engine 33 and does not require so prompt response to the operator.

Other control routines are of course applicable. Duration and the number of times for the sounding and non-sounding operations are optional. For example, it is practicable that the buzzer 166 sounds for one second, two seconds, three seconds and then four seconds with non-sounding time for one second between the respective sounding times. It is also practicable that sounds will be louder and louder after each non-sounding time. Also, a human voice or an artificial voice are applicable. Further, a visual warning such as a warning lump and a display indicating pictures and/or characters is applicable instead of the sound warning or in addition to it. Incidentally, this warning method can be applied to various warning systems such as an oil shortage warning system, an overheat warning system and a stop switch warning system.

Figure 6:
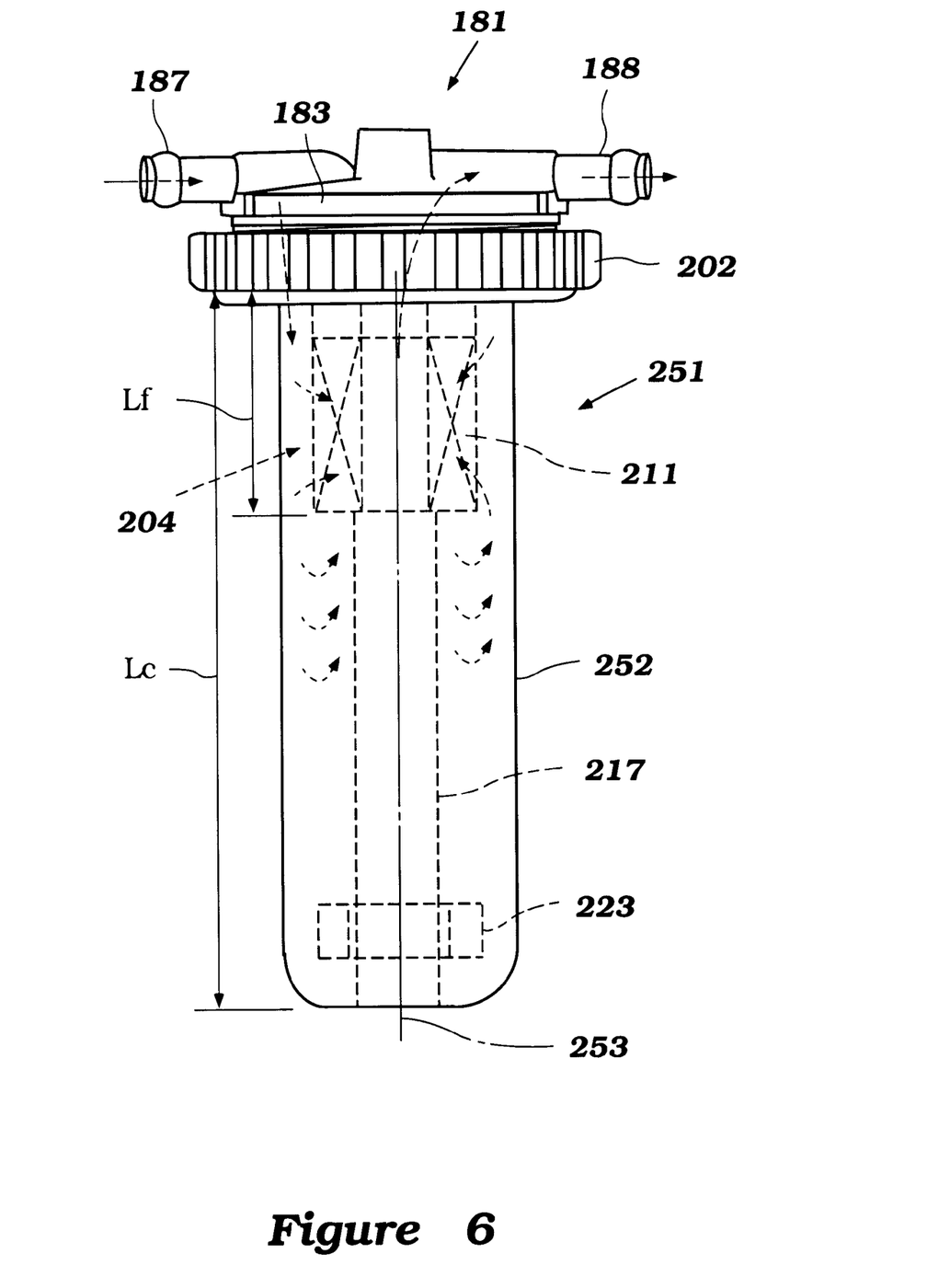
FIG. 6 is another arrangement of the fuel filter embodying another feature of this invention. A stay portion of a mounting body and a forked member are omitted in this figure. Also, the arrangement in a vessel is rather schematically illustrated.

FIG. 6 illustrates another embodiment of the fuel filter. In this figure, the same components and members which are already shown in FIG. 4 are assigned with the same reference numerals and will not be described repeatedly for avoiding redundancy. The stay portion 185 of the mounting body 183 and the forked member 184 are omitted in this figure. Also, the arrangement in the vessel is rather schematically illustrated.

A fuel filter 251 in this embodiment has a vessel 252 that has a relatively long length along the longitudinal axis 253 which is extending generally perpendicularly when the fuel filter 251 is mounted on the engine block 51. This length is preferably three times of or more than the length of the filter body 204 along the same axis 253. As seen, the length Lc measured from the end of the coupler 202 to the bottom of the vessel 252 is longer than three times of the length Lf measured from the same end of the coupler 202 to the bottom of the filter body 204 in this embodiment.

Because of this long size vessel 252, the water accumulated at the bottom of the vessel 252 hardly rises up to the position of the filter body 204 even with any vibration generated in the engine 33 and/or outboard motor 30 and further with upward and downward movement of the vessel 192 when the watercraft runs in a high speed and/or on rough water. Thus, the fuel passing through the filter body 204 will rarely contain water therein.

The elongation of the length of the vessel 252 along the axis thereof is easier than expansion of width in association with the outboard motor 30. Because the space between the engine 33 and the cowlings 34, 36 is relatively narrow. However, the expansion of the width shown in FIG. 4 is of course practicable in this embodiment also. The bottom of the vessel 252 is preferably located higher than the mating line of the top and bottom cowlings 34, 36 for easy access in this embodiment also.

It should be noted that the tray portion 216 of the stem 217 is not necessary for supporting the filter body 204 if one end of the filter body 204 is previously closed with the attachment member 212b or something else and the upside-down tray 203 can rigidly hold the filter body 204.

It should be also noted that the inlet passage can be provided on the vessel 192, 252. In this arrangement, the portion where the inlet passage is provided is preferably at the uppermost portion of the vessel 192, 252.

The inlet passage is not necessarily a tubular. A hole or an opening formed at the mounting body 183 or the vessel 192,252 is enough.

The features of this invention described above can be embodied in the engines that operate on a four stroke principle. Also, these features are applicable not only to the outboard motors but also to other marine engines, land vehicles including a lawn mower and stationary engines.

As described above, a fuel filter in accordance with the features of this invention is rarely influenced by vibration in separation of water from fuel. In addition, a water level in a vessel is accurately sensed and hence a proper warniing can be made any time. Further, the fuel filter can be made as small as possible even a water detection mechanism exists therein and thus it is particularly suitable to an outboard motor although not limited to.

Of course, the foregoing description is that of preferred embodiments of the invention, and various changes and modifications may be made without departing from the spirit and scope of the invention, as defined by the appended claims.

What is claimed is:

1. A fuel filter for an internal combustion engine, said fuel filter comprising a holder adapted to be mounted on said engine, a filter body coupled to said holder, said filter body having an end portion, a vessel detachably affixed to said holder for containing said filter body, said vessel having a bottom portion spaced from said end portion of said filter body such that a space is defined between said end portion of said filter body and said bottom portion of said vessel, an inlet for introducing fuel into said vessel, an outlet for discharging the fuel from said vessel, and said inlet and said outlet communicating with each other through said filter body, and a water detection mechanism disposed within said space between said end portion of said filter body and said bottom portion of said vessel.

2. A fuel filter as set forth in claim 1, wherein said holder is mounted on said engine via a damping member.

3. A fuel filter as set forth in claim 1 wherein said water detection mechanism is a combination of a proximity switch and a float bearing an activator for said proximity switch.

4. A fuel filter as set forth in claim 3 wherein said vessel has a stem extending upwardly from said bottom portion of said vessel, said float is put on said stem movably along an axis of said stem and said proximity switch is placed at said stem.

5. A fuel filter as set forth in claim 1, wherein said space between said filter body and said vessel is larger than a size of said inlet.

6. An internal combustion engine having a combustion chamber, an air induction device for supplying air to said combustion chamber, a fuel injector for supplying fuel to said combustion chamber for combustion with the air, a high pressure fuel pump for supplying the fuel to said fuel injector, and a fuel filter located upstream of said high pressure fuel pump, said fuel filter including a holder mounted on said engine and a filter body held by said holder, said filter body having an end portion, a vessel detachably affixed to said holder for containing said filter body, said vessel having a bottom portion spaced from said end portion of said filter body such that a space is defined between said end portion of said filter body and said bottom portion of said vessel, an inlet for introducing the fuel into said vessel, and an outlet for discharging the fuel from said vessel, said inlet and said outlet communicating with each other through said filter body.

7. An internal combustion engine for an outboard motor adapted to be supported by a watercraft, said engine comprising a fuel supply system, a first part of said fuel supply system being located at said engine, a second part of said fuel supply system being located apart from said engine and adapted to be located in said watercraft, said fuel supply system including a fuel filter located upstgream of said first part of said fuel supply system, said fuel filter including a holder adapted to be mounted on said engine, a filter body held by said holder, said filter body having an end portion, a vessel detachably affixed to said holder for containing said filter body, said vessel having a bottom portion spaced from said end portion of said filter by such that a space is defined between said end portion of said filter body and said bottom portion of said vessel, an inlet for introducing fuel into said vessel, and an outlet for discharging the fuel from said vessel, said inlet and said outlet being communicating with each other through said filter body.

8. A fuel filter for an internal combustion engine comprising a holder adapted to be mounted on said engine, a filter body held by said holder, said filter body having an end portion, a vessel detachably affixed to said holder for containing said filter body, said vessel having a bottom portion spaced from said end portion of said filter body such that a space is defined between said end portion of said filter bode and said bottom portion of said vessel, an inlet for introducing fuel into said vessel, and an outlet for discharging the fuel from said vessel, said inlet and said outlet communicating with each other through said filter body, said holder having a holding portion to hold said filter body, said holding portion being placed within said vessel and being spaced apart from said vessel by a dimension that is larger than a size of said inlet.

9. A fuel filter for an internal combustion engine comprising a holder adated to be mounted on said engine, a filter body held by said holder, said filter body having an end portion, a vessel detachably affixed to said holder for containing said filter body, a length of said vessel being at least three times as long as a length of said filter body, said vessel having a bottom portion spaced from said end portion of said filter body such that a space is defined between said end portion of said filter bodv and said bottom portion of said vessel, an inlet for introducing fuel into said vessel, and an outlet for discharging the fuel from said vessel, said inlet and said outlet communicating with each other through said filter body.

10. An internal combustion engine for an outboard motor having a top cowling and a bottom cowling both of which are mated with each other for enclosing said engine therein, said engine having a fuel filter mounted on a side wall of said engine, said fuel filter being placed higher than a mating line of said top cowling and said bottom cowling, said fuel filter having a holder mounted on said engine, a filter body held by said holder, said filter body having an end portion, a vessel detachably affixed to said holder for containing said filter body, said vessel having a bottom portion spaced from said end portion of said filter body such that a space is defined between said end portion of said filter body and said bottom portion of said vessel, an inlet for introducing fuel into said vessel, and an outlet for discharging the fuel from said vessel, said inlet and said outlet communicating with each other through said filter body.

11. A fuel filter for an internal combustion engine comprising a holder adapted to be mounted on said engine, a filter body held by said holder, said filter body having an end portion, a vessel detachably affixed to said holder for containing said filter body, said vessel being made of a transparent material, an inlet for introducing fuel into said vessel, and an outlet for discharging the fuel from said vessel, and said inlet and said outlet being connected relative to each other through said filter body for admitting flow of the fuel.

12. A water accumulation warning system for a fuel filter of an internal combustion engine, said fuel filter including a filter body, a vessel for containing said filter body, an inlet for introducing fuel into said vessel, and an outlet for discharging the fuel from said vessel, said inlet and said outlet being connected relative to each other through said filter body for admitting flow of the fuel, said water accumulation warning system including a water detection mechanism for detecting accumulation of water in said vessel to output a detection signal, and a warning mechanism for warning accumulation of water in said vessel based upon said detection signal.

13. A water accumulation warning system for a fuel filter as set forth in said claim 12 wherein said warning mechanism warns intermittently when receiving said detection signal.

14. A water accumulation warning system for a fuel filter as set forth in said claim 13, wherein said warning mechanism is configured to cease warning after repeating the warning for a predetermined time.

15. A water accumulation warning system for a fuel filter as set forth in said claim 12 wherein said fuel filter further includes a holder adapted to be mounted on said engine, a filter body is held by said holder, said filter body has an end portion, a vessel is detachably affixed to said holder, said vessel has a bottom portion spaced from said end portion of said filter body, and said water detection mechanism is placed under said filter body in said vessel.

16. A water accumulation warning system as set forth in claim 12, wherein said warning mechanism is configured to warn when receiving said detection signal, and said warning mechanism is configured to cease warning after repeating the warning for a predetermined time.

17. A fuel filter for an internal combustion engine comprising a filter element having an end portion, a filter housing arranged to contain the filter element, the filter housing having a bottom portion spaced from the end portion of the filter body such that a space is defined between the end portion of the filter body and the bottom portion of the vessel, an inlet arranged to introduce fuel into the filter housing, an outlet arranged to discharge the fuel from the filter housing, the inlet and the outlet communicating with each other through the filter element, and a water detection mechanism positioned in the space, the water detection mechanism including a proximity switch and a float having an activator that activates the proximity switch, the proximity switch being isolated from the fuel in the filter housing.

18. A fuel filter as set forth in claim 17, wherein the filter housing has a stem extending upwardly from the bottom portion of the filter housing, the float is mounted on the stem for slideable movement along an axis of the stem, and the proximity switch is positioned within the stem.

\* \* \* \* \*

UNITED STATES PATENT AND TRADEMARK OFFICE
CERTIFICATE OF CORRECTION

PATENT NO. : 6,224,439 B1  Page 1 of 1
DATED : May 1, 2001
INVENTOR(S) : Sato et al.

It is certified that error appears in the above-identified patent and that said Letters Patent is hereby corrected as shown below:

<u>Title page,</u>
Item [75], Inventors, should be -- Takayuki Sato, Hitoshi Motose, Hamamatsu, Shizuoka (JP) --.
Item [73], Assignee, should be -- Sanshin Kogyo Kabushiki Kaisha, Hamamatsu, Shizuoka (JP) --.

Signed and Sealed this

Fourth Day of April, 2006

JON W. DUDAS
*Director of the United States Patent and Trademark Office*